United States Patent
Gustin (10) Patent No.: US 9,450,916 B2
(45) Date of Patent: Sep. 20, 2016

(54) HARDWARE ASSIST FOR REDUNDANT ETHERNET NETWORK

(71) Applicant: Honeywell International, Inc., Morristown, NJ (US)

(72) Inventor: Jay Gustin, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 103 days.

(21) Appl. No.: 14/466,870

(22) Filed: Aug. 22, 2014

(65) Prior Publication Data

US 2016/0057045 A1  Feb. 25, 2016

(51) Int. Cl.
  *H04L 12/28* (2006.01)
  *H04L 29/06* (2006.01)

(52) U.S. Cl.
  CPC .............. *H04L 63/02* (2013.01); *H04L 63/164* (2013.01)

(58) Field of Classification Search
  CPC ... H04L 63/02; H04L 63/0236; H04L 45/66; H04L 12/5602
  USPC .......................................................... 370/254
  See application file for complete search history.

(56) References Cited

U.S. PATENT DOCUMENTS

| | | | |
|---|---|---|---|
| 5,361,256 A | 11/1994 | Doeringer et al. | |
| 5,394,402 A | 2/1995 | Ross | |
| 5,485,455 A * | 1/1996 | Dobbins | H04L 12/5602 370/255 |
| 5,617,421 A | 4/1997 | Chin et al. | |
| 5,963,540 A | 10/1999 | Bhaskaran | |
| 5,963,556 A | 10/1999 | Varghese et al. | |
| 6,076,115 A | 6/2000 | Sambamurthy et al. | |
| 6,081,512 A * | 6/2000 | Muller | H04L 45/02 370/256 |
| 6,108,713 A | 8/2000 | Sambamurthy et al. | |
| 6,133,846 A | 10/2000 | Birkedahl et al. | |
| 6,195,351 B1 | 2/2001 | Hiscock et al. | |
| 6,219,706 B1 | 4/2001 | Fan et al. | |
| 6,249,883 B1 | 6/2001 | Cassidy et al. | |

(Continued)

FOREIGN PATENT DOCUMENTS

| | | |
|---|---|---|
| CA | 2433576 A1 | 7/2002 |
| EP | 1545058 A2 | 6/2005 |

(Continued)

OTHER PUBLICATIONS

Welcher, et al. "Cisco PIX Firewalls: Access Lists and Management" Apr. 6, 2002, Chesapeake NetCraftsmen. Retrieved from www.netcraftsmen.net/resources/ Aug. 22, 2014, 5 pgs.

(Continued)

*Primary Examiner* — Sai-Ming Chan (57) ABSTRACT

A method includes receiving downlink packets from multiple physical Ethernet interfaces and selectively discarding some of the downlink packets based on a packet filtering criterion. The method also includes updating a network connectivity database using address information in non-discarded downlink packets. The method further includes mapping a path for each of the non-discarded downlink packets using the database and transmitting the non-discarded downlink packets to a single network interface. The method could also include receiving an uplink packet from the single network interface, selecting a primary physical Ethernet interface from the multiple physical Ethernet interfaces based on information in the database, and transmitting the uplink packet through the selected primary physical Ethernet interface.

23 Claims, 7 Drawing Sheets

(56) References Cited

U.S. PATENT DOCUMENTS

| | | |
|---|---|---|
| 6,275,503 B1 | 8/2001 | Driscoll |
| 6,308,282 B1 | 10/2001 | Huang et al. |
| 6,327,677 B1 | 12/2001 | Garg et al. |
| 6,356,553 B1 | 3/2002 | Nagami et al. |
| 6,373,376 B1 | 4/2002 | Adams et al. |
| 6,448,901 B1 | 9/2002 | Adams et al. |
| 6,467,003 B1 | 10/2002 | Doerenberg et al. |
| 6,510,154 B1 | 1/2003 | Mayes et al. |
| 6,529,780 B1 | 3/2003 | Soergel et al. |
| 6,556,575 B1 | 4/2003 | Denio et al. |
| 6,560,236 B1 | 5/2003 | Varghese et al. |
| 6,587,884 B1 | 7/2003 | Papadopoulos et al. |
| 6,760,782 B1 | 7/2004 | Swales |
| 6,826,697 B1 | 11/2004 | Moran |
| 6,851,621 B1 | 2/2005 | Wacker et al. |
| 6,901,443 B1 | 5/2005 | Huang et al. |
| 6,930,978 B2 | 8/2005 | Sharp et al. |
| 6,963,922 B2 | 11/2005 | Papadopoulos et al. |
| 7,099,336 B2 | 8/2006 | Kalkunte et al. |
| 7,269,157 B2 | 9/2007 | Klinker et al. |
| 7,305,486 B2 | 12/2007 | Ghose et al. |
| 7,313,613 B1 | 12/2007 | Brooking et al. |
| 7,453,822 B2 | 11/2008 | Van Slyke et al. |
| 7,457,870 B1 | 11/2008 | Lownsbrough et al. |
| 7,593,323 B2 | 9/2009 | Hiddle |
| 7,593,409 B2 | 9/2009 | Gustin |
| 8,259,593 B2 | 9/2012 | Baker et al. |
| 8,726,362 B2* | 5/2014 | Yoo ................... H04L 63/0236 726/13 |
| 2002/0046357 A1 | 4/2002 | Huang et al. |
| 2003/0165140 A1 | 9/2003 | Tang et al. |
| 2003/0223466 A1 | 12/2003 | Noronha, Jr. et al. |
| 2004/0143755 A1 | 7/2004 | Whitaker et al. |
| 2004/0146006 A1 | 7/2004 | Jackson |
| 2004/0190547 A1* | 9/2004 | Gordy .................... H04L 63/02 370/463 |
| 2004/0203906 A1 | 10/2004 | Kato et al. |
| 2004/0210623 A1 | 10/2004 | Hydrie et al. |
| 2005/0099955 A1 | 5/2005 | Mohan et al. |
| 2005/0129037 A1 | 6/2005 | Zumsteg et al. |
| 2005/0138432 A1 | 6/2005 | Ransom et al. |
| 2006/0182128 A1 | 8/2006 | Nakata et al. |
| 2006/0203720 A1 | 9/2006 | Kano |
| 2007/0008968 A1 | 1/2007 | Baker et al. |
| 2007/0027984 A1 | 2/2007 | Jorgensen et al. |
| 2007/0078667 A1 | 4/2007 | Chand et al. |
| 2009/0003351 A1 | 1/2009 | Sasaki et al. |
| 2013/0188635 A1 | 7/2013 | Park et al. |
| 2014/0029447 A1* | 1/2014 | Schrum, Jr. ............. H04L 45/66 370/252 |

FOREIGN PATENT DOCUMENTS

| | | |
|---|---|---|
| JP | 2002158693 A | 5/2002 |
| JP | 2011166692 A | 8/2011 |
| WO | WO 97/03549 A2 | 2/1997 |
| WO | WO 00/28715 A1 | 5/2000 |
| WO | WO 00/79758 A2 | 12/2000 |
| WO | WO 03/073283 A1 | 9/2003 |

OTHER PUBLICATIONS

Song, S. "Fault Recovery Port-based Fast Spanning Tree Algorithm (FRP-FAST) . . . on the Arbitrary Switched Network Topology," Oct. 2001, 8th IEEE Intl Conf., pp. 325-332.

Song, et al. "Fault-Tolerant Ethernet Middleware for IP-Based Process Control Networks," IEEE, Nov. 8, 2000, Piscataway, NJ, pp. 116-125.

International Search Report regarding PCT/US2006/024670 issued Oct. 25, 2006, 4 pages.

Written Opinion regarding PCT/US2006/024670 issued Oct. 25, 2006, 6 pages.

Notification of Transmittal of the International Search Report and the Written Opinion of the International Searching Authority, or the Declaration dated Nov. 25, 2015 in connection with International Patent Application No. PCT/US2015/044758.

* cited by examiner

HARDWARE ASSIST FOR REDUNDANT ETHERNET NETWORK

TECHNICAL FIELD

This disclosure is generally directed to Ethernet networks. More specifically, this disclosure is directed to a hardware assist for a redundant Ethernet network.

BACKGROUND

Network redundancy and fault tolerance are often desired in the equipment of an industrial process control and automation system. For example, redundancy typically helps to reduce the loss of control or view over an industrial process. There are various techniques for implementing redundancy in an Ethernet network, such as the implementation of a FAULT TOLERANT ETHERNET (FTE) network from HONEYWELL INTERNATIONAL INC. In this approach, code is inserted into the drivers of a device's operating system (OS). Another example of implementing redundancy in an Ethernet network adds intermediate drivers in what otherwise would be standard Ethernet Network Interface Cards (NICs).

Updates and changes to a device's OS occur frequently. Because of these frequent changes, extra work is often needed in order to update the drivers used by the OS. Also, qualification testing is often needed to ensure compatibility between drivers in the OS or in the NIC. In addition, certain operating systems are open source and therefore subject to open software rules. Open software rules may require that any kernel mode driver be published, which typically conflicts with a developer's desire to keep details of its software confidential or secure.

SUMMARY

This disclosure provides a hardware assist for a redundant Ethernet network.

In a first embodiment, a method includes receiving downlink packets from multiple physical Ethernet interfaces and selectively discarding some of the downlink packets based on a packet filtering criterion. The method also includes updating a network connectivity database using address information in non-discarded downlink packets. The method further includes mapping a path for each of the non-discarded downlink packets using the database and transmitting the non-discarded downlink packets to a single network interface.

In a second embodiment, an apparatus includes multiple control firewall engines configured to receive downlink packets from multiple physical Ethernet interfaces and selectively discard some of the downlink packets based on a packet filtering criterion. Each of the control firewall engines is configured to be coupled to a respective one of the physical Ethernet interfaces. The apparatus also includes at least one processing device configured to update a network connectivity database using address information in non-discarded downlink packets, map a path for each of the non-discarded downlink packets using the database, and initiate transmission of the non-discarded downlink packets to a single network interface.

In a third embodiment, a system includes multiple physical Ethernet interfaces configured to be coupled to multiple Ethernet communication links. The system also includes a hardware assist device having multiple control firewall engines and at least one processing device. The control firewall engines are configured to receive downlink packets from the physical Ethernet interfaces and selectively discard some of the downlink packets based on a packet filtering criterion. Each of the control firewall engines is configured to be coupled to a respective one of the physical Ethernet interfaces. The at least one processing device is configured to update a network connectivity database using address information in non-discarded downlink packets, map a path for each of the non-discarded downlink packets using the database, and initiate transmission of the non-discarded downlink packets to a single network interface.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1A through 7, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1A:
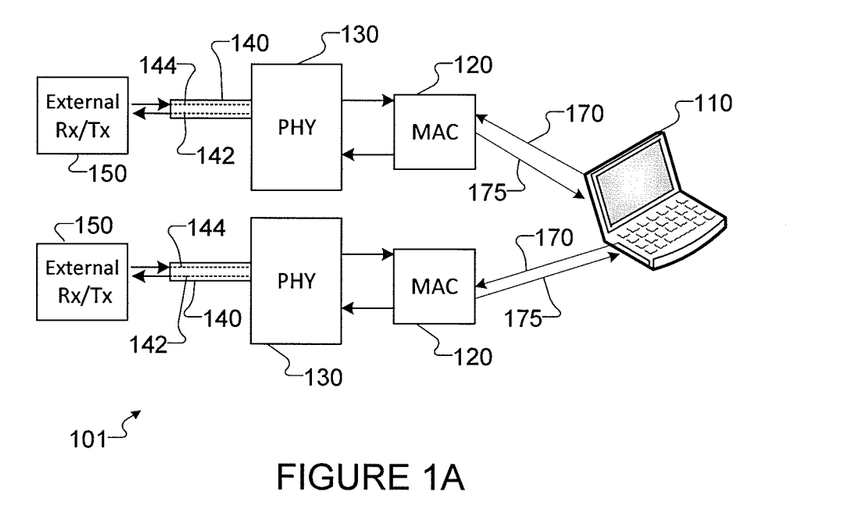
FIGS. 1A and 1B illustrate details of a portion of a first example redundant Ethernet network according to this disclosure.
Figure 1B:
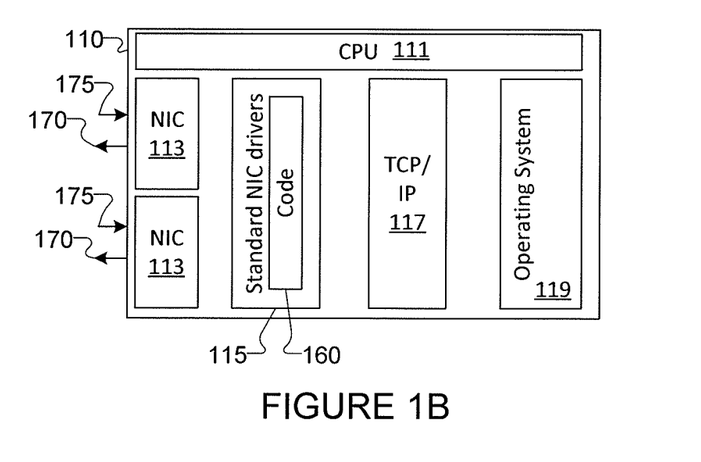

FIGS. 1A and 1B illustrate details of a portion of a first example redundant Ethernet network 101 according to this disclosure. As shown in FIG. 1A, the network 101 includes a Main Computing Unit (MCU) 110 that accesses the Ethernet network through redundant Ethernet links. Access to the Ethernet network enables the MCU 110, as an Ethernet node (such as a single connection Ethernet node), to communicate with other Ethernet nodes in the network. Each Ethernet link includes a media access controller (MAC) 120, a physical Ethernet interface (PHY) 130, an Ethernet cable 140, and an external control firewall 150. In some embodiments, the Ethernet network represents a FAULT TOLERANT ETHERNET (FTE) network from HONEYWELL INTERNATIONAL INC. (such as is described in U.S. Pat. No. 7,688,818, which is hereby incorporated by reference in its entirety). In an FTE network, colors such as green and yellow can be used to distinguish the connections in various pairs of redundant connections within the FTE network. In the following description, references may be made to green and yellow components in an FTE network, although this is for illustration only and does not limit this disclosure to any particular colors of cables or types of Ethernet network.

The MCU 110 selects a primary path through which to transmit uplink packets to the Ethernet network. For example, the MCU 110 can select either its "yellow" or "green" Ethernet link as the primary path for uplink communications based on various criteria, such as which path is currently the best path. As a particular example, the MCU 110 can select the "green" Ethernet link as the primary path. In that case, the MCU 110 transmits an uplink packet via the "green" MAC 120 and the "green" PHY 130, which can include an Ethernet physical layer transmitter and receiver or transceiver. The green PHY 130 transmits the uplink packet to the "green" control firewall 150 through the "green" Ethernet cable 140. A similar process can occur for the "yellow" path. The MCU 110 can determine that a selected primary path is blocked, faulted, or otherwise impaired from sending uplink packets and then reroute the uplink packets to the other Ethernet link. In addition, the MCU 110 can transmit the uplink packet to the "green" control firewall 150 using the "yellow" destination MAC address. A similar process can occur for the "yellow" path. The combination of path and destination address provides four viable paths for packets in FTE.

Each FTE node determines the primary path by periodically sending "heartbeat" or "beacon" packets that contain the health of the path as heard by that FTE node. In response to receiving these "heartbeat" or "beacon" packets, the FTE node updates the MAC address resolution table (MART). When transmitting, the table is used as a reference to determine the healthy path to be selected as the primary path.

The MCU 110 accepts downlink communications from both the "yellow" and "green" Ethernet link paths. In each path, downlink packets flow from the control firewall 150 to the Ethernet cable 140 and then to the PHY 130, which forwards the downlink packets to the MAC 120 for delivery to the MCU 110.

The MCU 110 represents any suitable device that communicates over an Ethernet network, such as a process controller, server, operator station, or other device in an industrial process control and automation system. Each MAC 120 includes any suitable structure for providing media access controller functionality. Each PHY 130 includes any suitable structure for providing physical Ethernet interface functionality. Each Ethernet cable 140 includes wiring 142 for uplink communications 170 and wiring 144 for downlink communications 175. Each Ethernet cable 140 represents any suitable Ethernet cable, such as a category 5 (Cat5) or category 6 (Cat6) cable. Each control firewall 150 includes any suitable structure for transmitting and receiving over an Ethernet network, such as an Ethernet receiver and an Ethernet transmitter or an Ethernet transceiver. As a particular example, each control firewall 150 could represent a CF9 firewall from HONEYWELL INTERNATIONAL INC (such as is described in U.S. Pat. No. 7,593,409, which is hereby incorporated by reference in its entirety).

Details of an example MCU 110 are shown in FIG. 1B. As shown in FIG. 1B, the MCU 110 includes a central processing unit (CPU) 111, multiple network interface cards (NICs) 113, a NIC driver 115, a TCP/IP engine 117, and an operating system (OS) 119. The CPU 111 is coupled to the other components 113-119 in the MCU 110. The CPU 111 includes at least one processing device, such as an x86 processor or a POWERPC. A NIC 113 can be provided for each redundant Ethernet link.

Code 160 can be inserted into standard NIC drivers 115 to enable the CPU 111 to perform various processes needed to communicate over an FTE or other redundant Ethernet network. However, when the OS 119 is updated, the code 160 may also need to be updated. This may require qualification testing or other testing to ensure proper operation of the code 160 with the updated OS 119 and to ensure compatibility between the NIC 113 and its drivers 115. Moreover, while the CPU 111 is executing the code 160, fewer processing resources within the CPU 111 are available to execute the operating system 119 or other applications (or vice versa).

In some instances, the NICs 113 can receive a flood of broadcasts in an Ethernet system. The flood can overwhelm the NICs 113, preventing the MCU 110 from receiving any communications other than the flood of broadcasts. The flood can also cause the CPU 111 to continuously process Ethernet packets, preventing the CPU 111 from executing any other processes, such as the OS 119 or other applications.

Figure 2A:
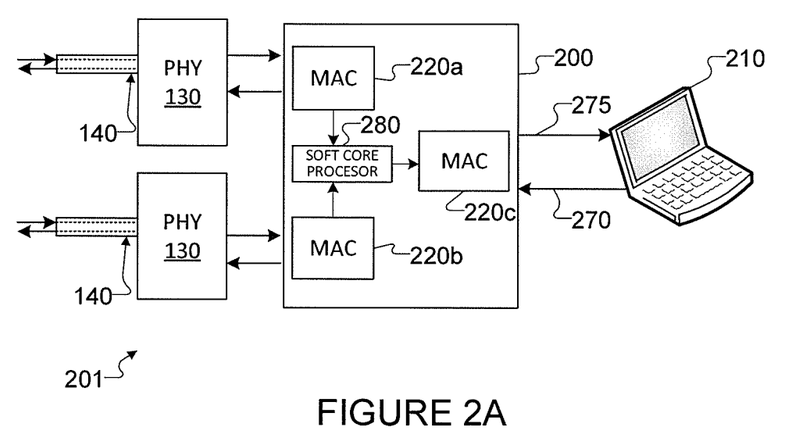
FIGS. 2A and 2B illustrate details of a portion of a second example redundant Ethernet network according to this disclosure.
Figure 2B:
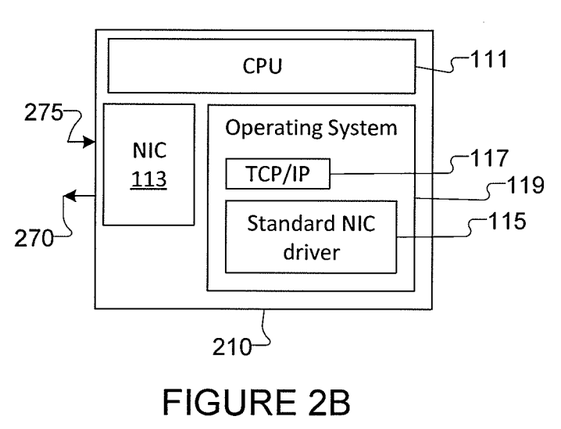

FIGS. 2A and 2B illustrate details of a portion of a second example redundant Ethernet network 201 according to this disclosure. As shown in FIG. 2A, an MCU 210 communicates over the network via a pre-processing hardware unit 200. The pre-processing hardware unit 200 performs various processes on packets between the MCU 210 and the redundant Ethernet PHYs 130. In some embodiments, the pre-processing hardware unit 200 can be implemented using a field programmable gate array (FPGA). In this example, the pre-processing hardware unit 200 includes three MACs 220a-220c and a soft core processor 280. The MACs 220a-220c are respectively coupled to the first Ethernet link, the second Ethernet link, and the MCU 210.

The pre-processing hardware unit 200 performs various processes to support uplink communications 270 and downlink communications 275 between the MCU 210 and the PHYs 130. For example, the pre-processing hardware unit 200 selects a primary path through which to transmit uplink packets to from the Ethernet network 201. When a downlink packet for the MCU 210 is present at the upper PHY 130, the MAC 220a retrieves the packet from the upper PHY 130, the pre-processing hardware unit 200 performs suitable processes on the packet (such as packet filtering), and the MAC 220c transmits the downlink packet to the MCU 210. The MAC 220b can be used in a similar manner. When an uplink packet from the MCU 210 is ready to be transmitted, the MAC 220c retrieves the uplink packet from the MCU 210, the pre-processing hardware unit 200 performs suitable processes on the packet (such as selecting the "yellow" or "green" MAC or Ethernet link for outputting the packet), and the selected MAC 220 or 220b transmits the uplink packet to the corresponding PHY 130 of the selected Ethernet link.

FIG. 2B illustrates the MCU 210 of FIG. 2A. As shown in FIG. 2B, the MCU 210 includes a CPU 111, a NIC 113, and an OS 119. The OS 119 includes a standard MC driver 115 and a TCP/IP engine 117. The MCU 210 does not include any FTE or other code 160 added within the standard NIC driver 115 or an intermediate driver. The NIC 113 transmits and receives uplink and downlink communications to and from the MAC 220c.

This approach can provide various advantages depending on the implementation. For example, the pre-processing hardware unit 200 can reduce the processing load on the CPU 111 by removing certain processing from the MCU 210. As particular examples, the MCU 210 may have no need for the code 160 or related drivers. In such an MCU 210, the CPU 111 can execute the OS 119 and other applications more quickly. Also, eliminating the code 160 or related drivers from the MCU 210 can simplify the drivers that are needed in the MCU 210 and can reduce the amount of code and drivers that need updating in the MCU 210. It can further eliminate the qualification testing needed to ensure compatibility between the NIC 113 and the drivers 115 and the qualification testing needed to ensure compatibility with the OS 119. In the case of an open source operating system, removing the code 160 or related drivers from the MCU 210 can also eliminate any requirement to publish the code 160.

Figure 3A:
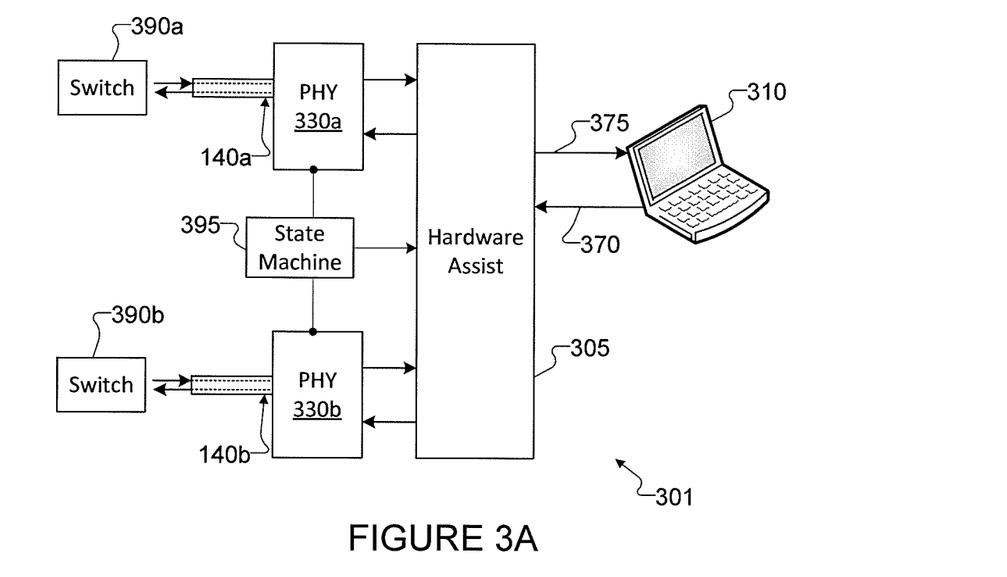
FIGS. 3A and 3B illustrate details of a portion of an example redundant Ethernet network including a hardware assist according to this disclosure.
Figure 3B:
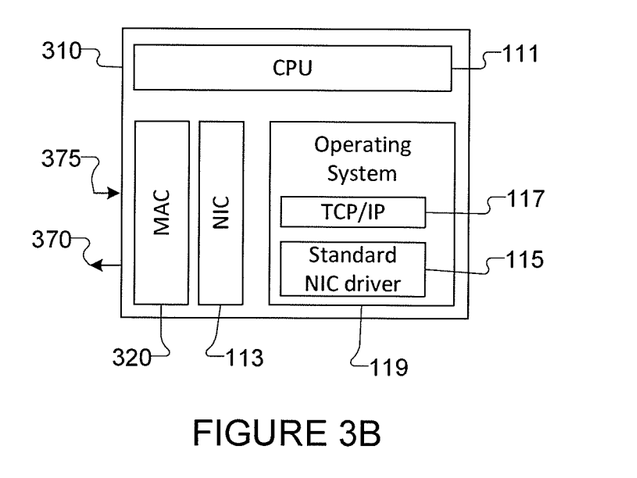

FIGS. 3A and 3B illustrate details of a portion of an example redundant Ethernet network 301 including a hardware assist 305 according to this disclosure. The hardware assist 305 enables an Ethernet node to have redundant Ethernet connections without using the Ethernet node's embedded processor for implementing uplink and download processes needed for FTE or other redundant Ethernet networks.

As shown in FIG. 3A, an MCU 310 transmits uplink communications to and receives downlink communications from the Ethernet network 301 through redundant Ethernet links (which could be distinguished as green and yellow). Each Ethernet link includes a PHY 330a-330b, an Ethernet cable 140a-140b, and a switch 390a-390b. As a particular example, the switches 390a-390b could be implemented using standard Ethernet switches instead of implemented using control firewalls. The switches 390a-390b can represent the ends of the redundant Ethernet links. Each switch 390a-390b is connected to the MCU 310 through the hardware assist 305.

When the Ethernet network 301 has a downlink packet destined for the MCU 310, one or both switches 390a-390b receive the downlink packet and forward the downlink packet to one or both PHYs 330a-330b. When the MCU 310 has an uplink packet destined for another Ethernet node within the Ethernet network, one of the PHYs 330a-330b receives the uplink packet from the hardware assist 305 and forwards the uplink packet to one of the switches 390a-390b.

In some embodiments, a state machine 395 detects when a packet is present within one of the PHYs 330a-330b and, in response, sends an indicator to the hardware assist 305 indicating that a packet is present within the PHY buffering the packet. The hardware assist 305 can receive the indicator from the state machine 395 and, in response, retrieve the packet from the appropriate PHY 330a-330b into a control firewall reception engine.

The hardware assist 305 processes uplink and downlink packets between the MCU 310 and the PHYs 330a-330b. When a downlink packet for the MCU 310 is received, the hardware assist 305 retrieves the packet from the appropriate PHY 330a-330b, filters the packet to determine whether the packet passes at least one filtering criterion, discards the packet if not, and transmits the packet to the MCU 310 if so. When an uplink packet from the MCU 310 is ready to be transmitted, the hardware assist 305 retrieves the uplink packet from the MCU 310, conducts a deep packet inspection, performs decoding, selects one of the PHYs 330a-330b as a primary path for the packet, maps the primary path for the packet via the selected PHY, and transmits the uplink packet to the selected PHY unless the primary path is determined to be blocked. If the primary path is determined to be blocked, the hardware assist 305 remaps a different secondary path for the uplink packet and transmits the packet to the PHY of the secondary path. In order to maintain the Ethernet layer 2 bridging tables in the switching devices 390a and 390b, the hardware assist 305 substitutes the secondary source MAC address in the packet. If during the packet inspection, the hardware assist 305 determines that the primary path is blocked, but the local primary to destination secondary path is available, the packet hardware assist 305 substitutes the secondary destination MAC address into the packet in order for the packet to traverse a viable path.

FIG. 3B illustrates the MCU 310 of FIG. 3A. As shown in FIG. 3B, the MCU 310 includes a CPU 111, a MAC 320, a MC 113, a standard NIC driver 115, a TCP/IP engine 117, and an OS 119. The MAC 320 transmits packets between the hardware assist 305 and the NIC 113, and the NIC 113 provides a hardware interface between the CPU 111 and the hardware assist 305. The MCU 310 does not include any FTE or other code 160 added within the standard NIC driver 115 or an intermediate driver. The MCU 310 transmits uplink communications 370 to and receives downlink communications 375 from the hardware assist 305.

As described in more detail below, the use of the hardware assist 305 can achieve the same benefits as obtained using the pre-processing hardware unit 200. For example, the hardware assist 305 can reduce the processing load on the CPU 111 of the MCU 310, simplify the drivers that are needed in the MCU 310, and reduce the amount of code and drivers that need updating in the MCU 310. It can also eliminate the qualification testing needed to ensure compatibility between the NIC 113 and the drivers 115 and the qualification testing needed to ensure compatibility with the OS 119. In the case of an open source operating system, removing the code 160 or related drivers from the MCU 310 can also eliminate any requirement to publish the code 160. Moreover, the hardware assist 305 reduces the need to support three MACs as required in the pre-processing hardware unit 200. In addition, the hardware assist 305 can be implemented using an FPGA, which can enable higher network speeds (such as 1 Gbps or higher).

Although FIGS. 1A through 3C illustrate portions of example redundant Ethernet networks, various changes may be made to FIGS. 1A through 3C. For example, features in one or some of these figures could be incorporated into others of these figures.

Figure 4:
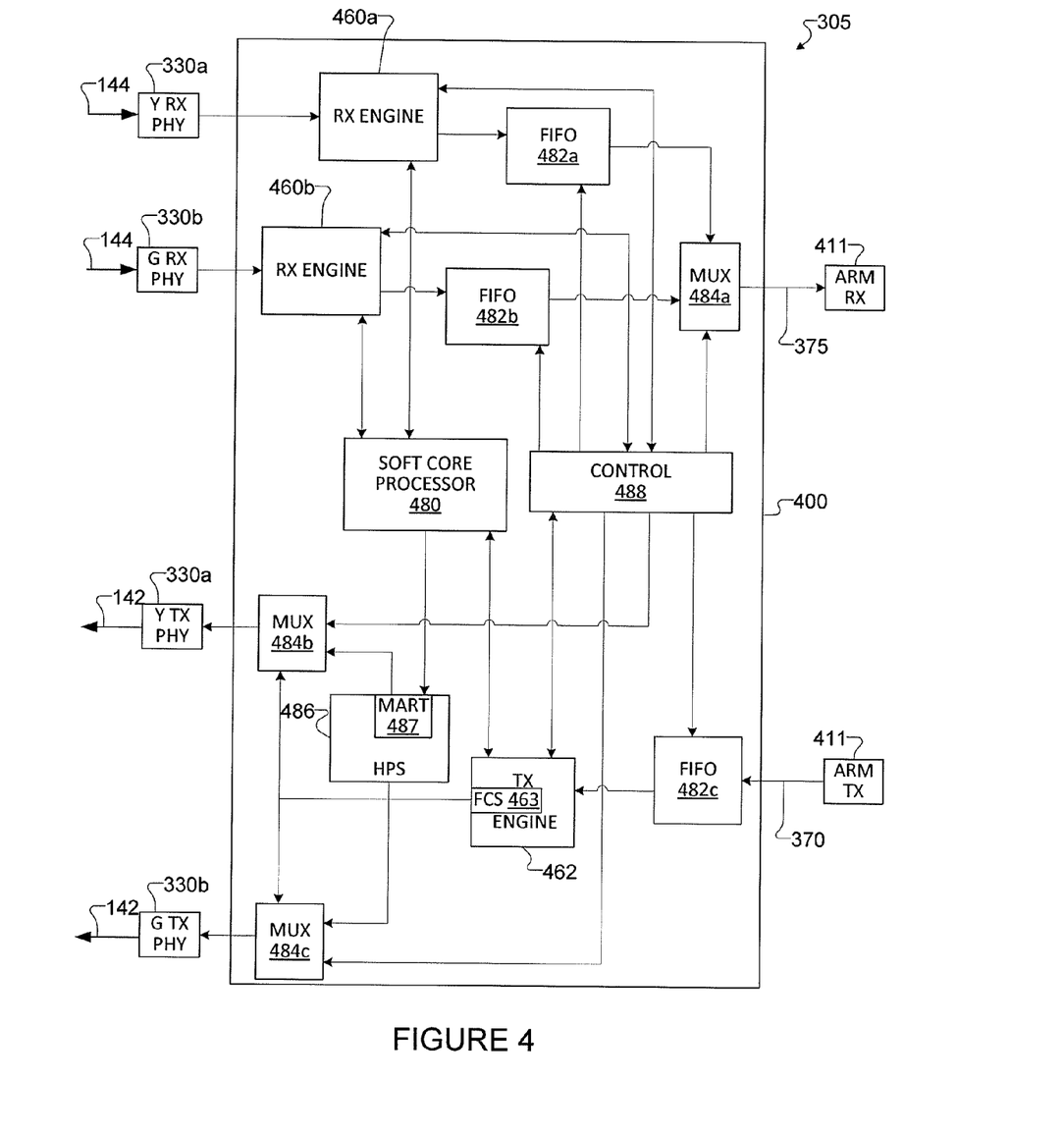
FIG. 4 illustrates an example hardware assist for a redundant Ethernet network according to this disclosure.

FIG. 4 illustrates an example hardware assist 305 for a redundant Ethernet network according to this disclosure. For ease of explanation, the hardware assist 305 is described with respect to the Ethernet network 301, although the hardware assist 305 could be used in any suitable system. In some embodiments, the hardware assist 305 can be implemented using a "system on a chip" FPGA 400, such as a XILINX ZYNQ FPGA.

As shown in FIG. 4, the FPGA 400 receives downlink communications from multiple PHYs 330a-330b and transmits the received downlink communications to an advanced reduced instruction set computer machine (ARM) processor 411, which can represent the CPU 111 in the MCU 310. The ARM processor 411 is shown here as having two parts, namely a receiver (Rx) for downlink communications and a transmitter (Tx) for uplink communications. The same type of division is shown for each PHY 330a-330b.

In the implementation shown in FIG. 4, the FPGA 400 includes a soft core processor 480, such as a XILINX MICROBLAZE soft core processor. The soft core processor 480 implements an Ethernet network manager that supports various functions of the hardware assist 305. Note, however, that the FPGA 400 could omit a soft core processor 480 and instead be coupled to an external processor acting as an Ethernet network manager.

The soft core processor 480 is coupled to control firewall engines 460a-460b, 462 and a heartbeat packet storage (HPS) 486. As the manager for uplink communications, the processor 480 receives an indication (such as via an interrupt) that an uplink packet is ready for inspection and, in response, retrieves a portion of the packet for inspection. The processor 480 can perform a deep packet inspection process on the retrieved portion and update a network connectivity database (such as a MAC address resolution table or "MART" 487) by inserting the inspected portion of the packet. The processor 480 uses the health information stored in the MART 487 to determine where to send the packet. The processor 480 selects a best path as a primary physical path for the packet to be transmitted to the Ethernet network based on the health of the network in the MART 487. If necessary, the processor 480 inserts the address of the best path as the destination address of the uplink packet. In some instances, the processor 480 need not insert a new destination address because the original destination address is already the address of the best path. If the processor 480 has selected the secondary path for transmitting the packet, the processor 480 can insert a new source MAC address in the packet. As the manager for downlink communications, the processor 480 retrieves a destination address portion of a downlink packet and performs a deep packet inspection process by comparing the destination address to addresses in the MART 487. If the packet's destination address is not in the MART 487, then the processor 480 stores the packet's destination address in another table (for example, the single attached node table) as a non-FTE node. The single attached node table is used to select the best path for a single attached node not participating in the FTE protocol.

Various multiplexers (MUX) 484a-484c are controlled (via a controller 488) to support different communication paths through the FPGA 400. In this example, the FPGA 400 includes a multiple-to-one (such as 2-to-1) receive path for receiving downlink communications from multiple Ethernet links and routing the received downlink communications to the single MCU 310. The FPGA 400 also includes a one-to-multiple (such as 1-to-2) transmit path for receiving uplink communications from the single MCU 310 and routing the received uplink communications through the multiple Ethernet links.

The HPS 486 stores heartbeat signals, such as those periodically transmitted according to the FTE protocol (like once per second). For example, one heartbeat packet can have a source MAC address corresponding to the "yellow" Ethernet link, and one heartbeat packet can have a source MAC address corresponding to the "green" Ethernet link. Each heartbeat packet can include information about what other Ethernet nodes have detected in received test packets, which can be used to determine whether the Ethernet network has a fault or is otherwise broken somewhere.

The control firewall engines here include multiple reception control firewall engines 460a-460b and at least one transmission control firewall engine 462. The control firewall engines 460a-460b, 462 can receive packets in parallel and need not enter standby mode while another engine receives a packet. Each engine 460a-460b, 462 can perform packet filtering functions, such as when packets are received, and discard packets that do not meet the filtering criteria. For example, the control firewall engine 460a-460b, 462 can recognize packets that are part of the FTE protocol and can limit the quantity and rate of multicast or broadcast communications allowed to pass through the control firewall engine 460a-460b, 462. After receiving a threshold number of multicast/broadcast packets within a specified period of time, the control firewall engine 460a-460b, 462 can discard multicast/broadcast packets that exceed the threshold number. The control firewall engine 460a-460b, 462 can also filter TCP, IP, UDP, and other types of communications. Each control firewall engine 460a-460b, 462 can also perform packet detection functions, such as by determining when a packet is available and sending an indicator to the soft core processor 480 indicating that a portion of the packet is ready to be inspected. A CF9 engine is an example of a control firewall engine that can be implemented in the FPGA 400. The control firewall engines 460a-460b protect the MCU 310 from being overwhelmed by a flood of broadcasts, such as by limiting the number of Ethernet broadcast communications that pass through the packet filter. By comparison, the CPU 111 would ordinarily process every packet received through the PHYs 130, but the MCU 310 only receives packets that are not discarded through the packet filtering process of the FPGA 400. This allows both the soft core processor 480 and the ARM processor 411 to avoid the heavy load of packet processing.

The control firewall engines 460a-460b are coupled to buffers 482a-482b, and the control firewall engine 462 is coupled to a buffer 482c. The buffers 482a-482c could represent first in first out (FIFO) queues, shift registers, or other suitable memory structures. Each control firewall engine 460a-460b, 462 can also include its own internal memory such as a packet buffer, which can be used to make at least a portion of received packets accessible to the processor 480.

For uplink packets, the control firewall engine 462 receives an uplink packet from the buffer 482c, processes the received uplink packet, and forwards the processed packet to a selected MUX 484b or 484c. The control firewall engine 462 allows the processor 480 to access its internal packet buffer in order for the uplink packet to be routed to the best path (the primary physical path). The particular MUX 484b or 484c that is selected can be based on an indication from the processor 480. In this example, the control firewall engine 462 includes a frame check sequence (FCS) processing block 463 for calculating an FCS value. The control firewall engine 462 inserts the calculated FCS value into a packet prior to outputting the packet to the selected MUX 484b or 484c. In this example, each MUX 484b-484c can selectively output either an uplink packet from the control firewall engine 462 or a heartbeat packet from the HPS 486.

For downlink packets, one or more of the control firewall engines 460a-460b receive a downlink packet, which can be stored in one or more of the buffers 482a-482b after filtering. The MUX 484a is operated to provide the downlink packet from a selected buffer 482a-482b to the ARM processor 411. The operation of the MUX 484a can be based on an indication from the processor 480.

In some embodiments, the HPS 486 stores a status of the heartbeat packets that the FPGA 400 has received from other nodes. For example, a network connectivity database (such as the MART 487) can be stored in the HPS 486, where the MART 487 includes information about the health of the Ethernet network. The HPS 486 receives a heartbeat packet from the processor 480 and can duplicate the received packet, yielding one heartbeat packet for the "yellow" Ethernet link and after substitution of the source MAC address and indicators necessary, one heartbeat packet for the "green" Ethernet link. The HPS 486 also receives a control signal from the processor 480 instructing the HPS 486 to output both of the heartbeat packets to the MUX 484*b* and the MUX 484*c* in sequence.

The controller 488 is configured to generate control signals that control transmit path operations and receive path operations within the FPGA 400. Communication links between the controller 488 and the control firewall engines 460*a*-460*b*, 462 can be bidirectional and allow the controller 488 to receive signals from the control firewall engines 460*a*-460*b*, 462. As example functions, for an uplink packet, the controller 488 can instruct the control firewall engine 462 to retrieve a packet from the buffer 482*c*, and the controller 488 can configure one of the MUXes 484*b*-484*c* to output the uplink packet on the appropriate PHY 330*a*-330*b*. For a heartbeat packet, the controller 488 can configure one of the MUXes 484*b*-484*c* to output the heartbeat packet from the HPS 486 on the appropriate PHY 330*a*-330*b*. For a downlink packet, the controller 488 can receive indications that one or both control firewall engines 460*a*-460*b* have stored the downlink packet in one or both buffers 482*a*-482*b*, and the controller 488 can configure the MUX 484*a* to output the downlink packet.

In some embodiments, the controller 488 is configured to execute state machine process controls (such as the functions of the state machine 395 described above). For example, the controller 488 can be configured to detect when a packet is present within one of the PHYs 330*a*-330*b* and, in response, retrieve the packet from the PHY that is buffering the packet. In other embodiments, the controller 488 is coupled to the state machine 395 and receives indicators from the state machine 395 indicating which PHY is buffering packets for the MCU 310.

In some embodiments, the controller 488 is coupled to the processor 480. In this case, the processor 480 can transmit signals (such as interrupt signals) to the controller 488 in order to indicate the destination address of the best path for an uplink packet. In response, the controller 488 controls the MUXes 484*b*-484*c* and instructs the control firewall engine 462 to commence outputting the uplink packet. The processor 480 can also transmit an interrupt signal to the controller 488 indicating that the FPGA 400 has commenced sending heartbeat packets through the Ethernet links. The controller 488 can delay transmitting and processing uplink packets received from the MCU 310, and the buffer 482*c* can commence stacking uplink communications 370.

The FPGA 400 here can preserve a standard MC driver 115, which simplifies OS upgrades. The FPGA 400 can also allow less costly commercial switches to be used, eliminates an extra NIC 113 within the MCU, and eliminates the code 160 added to modify standard NIC drivers 115. In addition, the soft core processor 480 can be simpler and have less code to execute than the code 160 or drivers executed by the CPU 111.

Although FIG. 4 illustrates one example of a hardware assist 305 for a redundant Ethernet network, various changes may be made to FIG. 4. For example, the hardware assist 305 could be implemented in any other suitable manner and need not be implemented using an FPGA.

Figure 5:
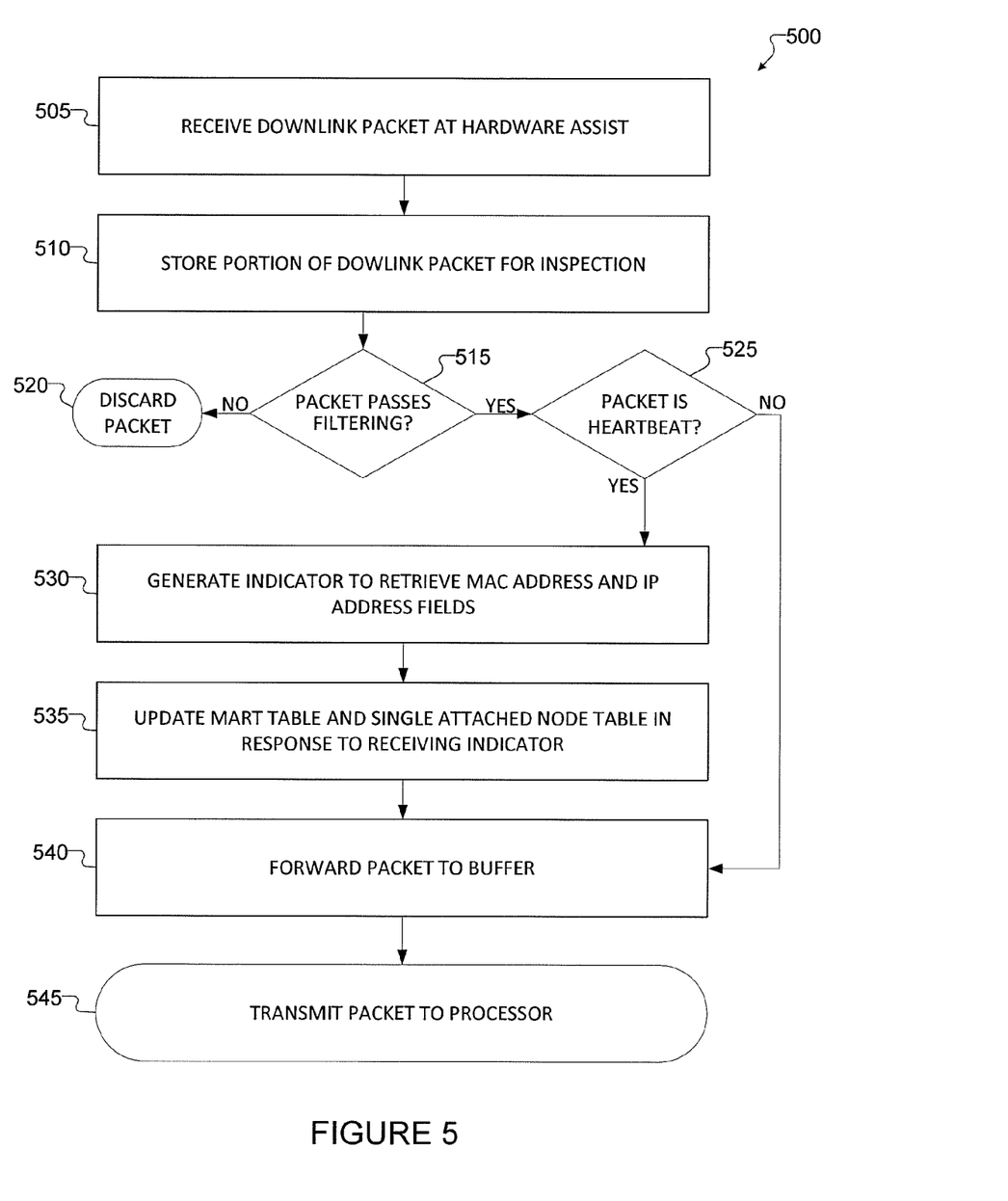
FIG. 5 illustrates an example method for downlink reception processing in a redundant Ethernet network according to this disclosure.

FIG. 5 illustrates an example method 500 for downlink reception processing in a redundant Ethernet network according to this disclosure. For ease of explanation, the method 500 is described with respect to the FPGA 400 implementing the hardware assist 305 of FIG. 3. The method 500 could be used by any other suitable device.

In step 505, the FPGA 400 receives a downlink packet from the switches 390*a*-390*b*. For example, one or more of the control firewall engines 460*a*-460*b* can receive the downlink packet from one or more switches 390*a*-390*b*. In step 510, the FPGA 400 stores a portion of the downlink packet for inspection. For example, each control firewall engine 460*a*-460*b* can store a header portion of the downlink packet in its internal memory. The header portion of the downlink packet can include address information, such as the MAC address field and IP address field. In some embodiments, each control firewall engine 460*a*-460*b* stores the MAC address field portion in its internal memory separately from where the IP address field portion is stored in the internal memory.

In step 515, the FPGA 400 filters the received downlink packet using a packet filter, such as one that allows qualified packets to pass through and prohibits non-qualified packets from passing through. For example, each control firewall engine 460*a*-460*b* can include a packet filter that determines whether the received downlink packet is a valid HONEYWELL EXPERION control data packet. If the received downlink packet does not pass the filtering, in step 520, the control firewall engine 460*a*-460*b* discards the packet, thereby prohibiting the non-qualified packet from being transmitted to the MCU 310. If the received downlink packet passes the filtering, in step 525, the control firewall engine 460*a*-460*b* determines whether the packet is a FTE heartbeat packet. If the received downlink packet is a heartbeat packet, the process proceeds to step 530; otherwise, the process proceeds to step 540.

In step 530, the control firewall engine 460*a*-460*b* indicates to the processor 480 that the header portion of the packet is ready for inspection. The indicator from the control firewall engine 460*a*-460*b* indicates to the processor 480 to retrieve the MAC address field and the IP address field from the internal memory of the control firewall engine. In step 535, in response to receiving the indicator from the control firewall engine, the processor 480 updates the network connectivity database. For example, in response to receiving the indicator from the control firewall engine 460*a*-460*b*, the processor 480 retrieves the MAC address and IP address fields from the internal memory of the control firewall engine. The processor 480 uses the retrieved address information to update the MART 487 and the single attached node tables of the network connectivity database.

In step 540, the control firewall engine 460*a*-460*b* forwards the downlink packet to a corresponding buffer 482*a*-482*b*. For example, in response a determination that the received downlink packet is not an FTE heartbeat, the control firewall engine 460*a*-460*b* forwards the downlink packet to a corresponding buffer 482*a*-482*b*. Also, the control firewall engine 460*a*-460*b* can forward the downlink packet to a corresponding buffer 482*a*-482*b* in response to receiving a control signal from the controller 488. The controller 488 sends a control signal to the buffer 482*a*-482*b* instructing it to receive the downlink packet from the control firewall engine 460*a*-460*b*. In step 545, the FPGA 400 transmits the downlink packet to the MCU 310. The controller 488 can send a control signal to the MUX 484*a* indicating from which of the buffers 482*a*-482*b* to retrieve the downlink packet.

Figure 6:
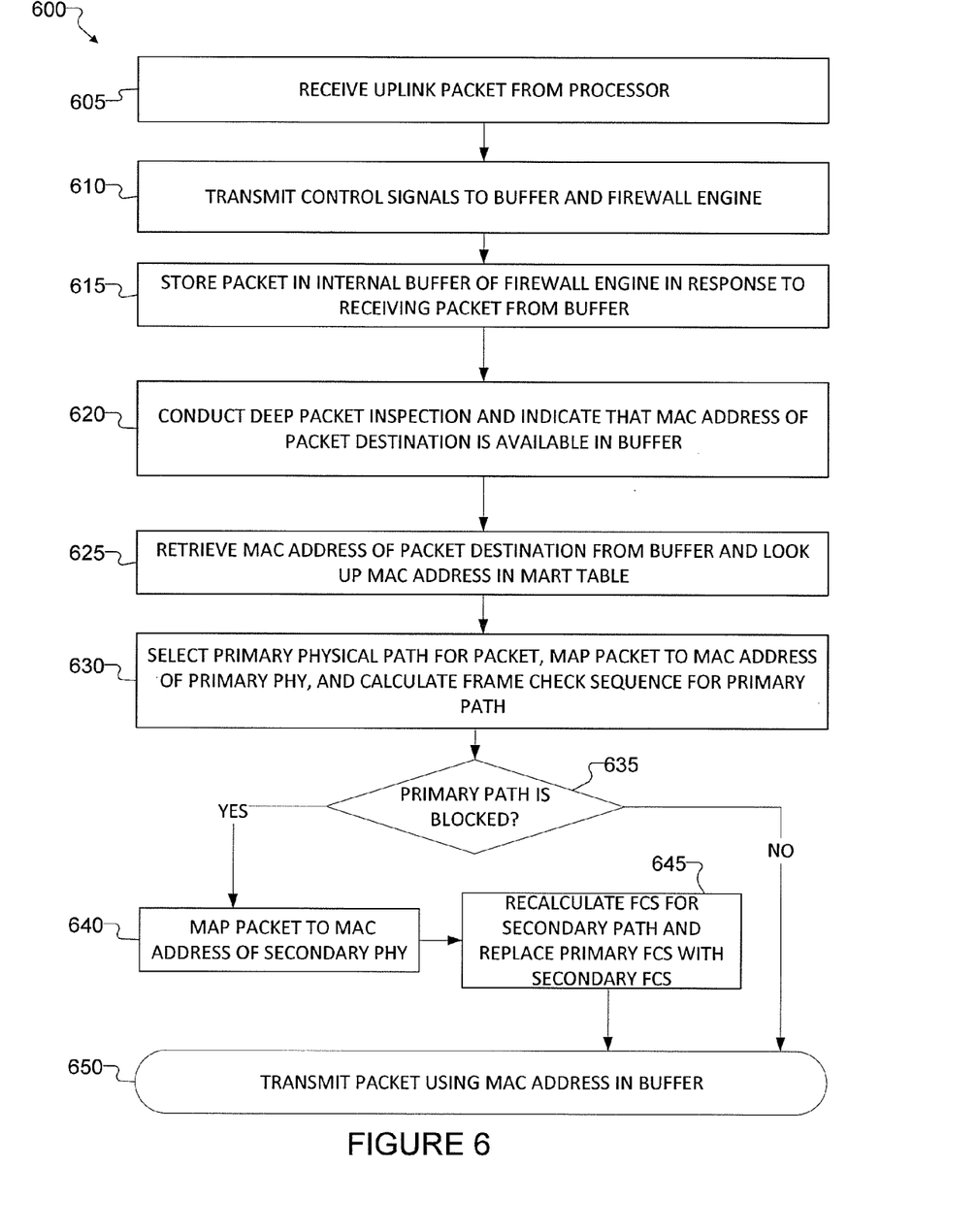
FIG. 6 illustrates an example method for uplink transmission processing in a redundant Ethernet network according to this disclosure.

FIG. 6 illustrates an example method 600 for uplink transmission processing in a redundant Ethernet network according to this disclosure. For ease of explanation, the method 600 is described with respect to the FPGA 400 implementing the hardware assist 305 of FIG. 3. The method 600 could be used by any other suitable device.

In step 605, the FPGA 400 receives an uplink packet from the MCU 310. For example, the buffer 482*c* can receive an uplink packet from the MCU 310. In step 610, the controller 488 sends a control signal to the buffer 482*c* instructing it to forward the uplink packet to the control firewall engine 462 for processing. The controller 488 also sends a control signal to the control firewall engine 462 instructing it to receive the uplink packet from the buffer 482*c*. In step 615, in response to receiving the uplink packet from the buffer 482*c*, the control firewall engine 462 stores the uplink packet in its internal memory (such as its internal packet buffer).

In step 620, the FPGA 400 conducts a deep packet inspection of the uplink packet. For example, the control firewall engine 462 can indicate to the processor 480 that the MAC address of the packet destination is available in the packet buffer. In step 625, in response to receiving the indicator, the processor 480 retrieves the destination MAC address of the packet from the internal memory of the control firewall engine 462. The processor 480 looks up the retrieved MAC address in the MART 487 by comparing the retrieved MAC address to the MAC addresses stored in the MART 487.

In step 630, the FPGA 400 selects a primary physical path for the uplink packet based on information in the network connectivity database. For example, the processor 480 can use information in the MART 487 to select the primary physical path. The processor 480 also maps the uplink packet to the destination MAC address of the PHY corresponding to the primary physical path in step 630. For instance, if the processor 480 maps the uplink packet to the MAC address of the PHY 330*a* or 330*b* (depending on whether the "yellow" or "green" path is selected) the processor 480 inserts the corresponding selected MAC addresses based on the transmitting PHY and the receiving PHY into the internal memory of the control firewall engine 462. The processor 480 can indicate the selected primary physical path to the control firewall engine 462 by transmitting an indicator selecting one of the MUXes 484*b* or 484*c* to which the control firewall engine 462 will output the uplink packet. In some embodiments, the control firewall engine 462 calculates an FSC for the primary path and inserts the calculated FSC into the uplink packet prior to outputting the uplink packet.

In step 635, the FPGA 400 determines whether the selected primary physical path is blocked. If the primary physical path is blocked, the process proceeds to step 640; otherwise, the process proceeds to step 650.

In step 640, the FPGA 400 reroutes the uplink packet to a secondary physical path by mapping the uplink packet to the MAC address of a secondary PHY based on a determination that the primary path is blocked. For example, if the processor 480 selected the PHY 330*a* as the primary path, the processor 480 maps the uplink packet to the MAC address of the PHY 330*b* (or vice versa). The processor 480 indicates the selected secondary physical path to the control firewall engine 462 by transmitting an indicator selecting one of the MUXes 484*b* or 484*c* to which the control firewall engine 462 will output the uplink packet.

In step 645, the FPGA 400 calculates a new FCS for the secondary path and replaces the previously calculated FCS for the primary path with the new FCS. For example, the FCS 463 within the control firewall engine 462 can calculate each FCS value. The FPGA 400 can insert the calculated FSC into the uplink packet just prior to outputting the uplink packet.

In step 650, the FPGA 400 transmits the uplink packet to the MAC address in the packet buffer. For example, based on the indicator received in step 630 or 640, the control firewall engine 462 can output the uplink packet to the selected MUX. The controller 488 sends a control signal to the selected MUX instructing it to transmit the uplink packet to the corresponding PHY. When the determination in step 635 is that the primary physical path is not blocked, the MAC address in the packet buffer is the MAC address of the PHY corresponding to the primary physical path. When the determination in step 635 is that the primary physical path is blocked, the path is determined by substitution of MAC addresses and selection of the transmitting PHY. If the transmitting PHY is yellow and the receiving is green, the destination address must be substituted, and the PHY 330*b* path is selected. If the transmitting PHY is green and the receiving is yellow, the source address must be substituted and the PHY 330*a* path is selected. If the transmitting PHY is green and the receiving is green, both source and destination addresses must be substituted and the PHY 330*b* path is selected.

Figure 7:
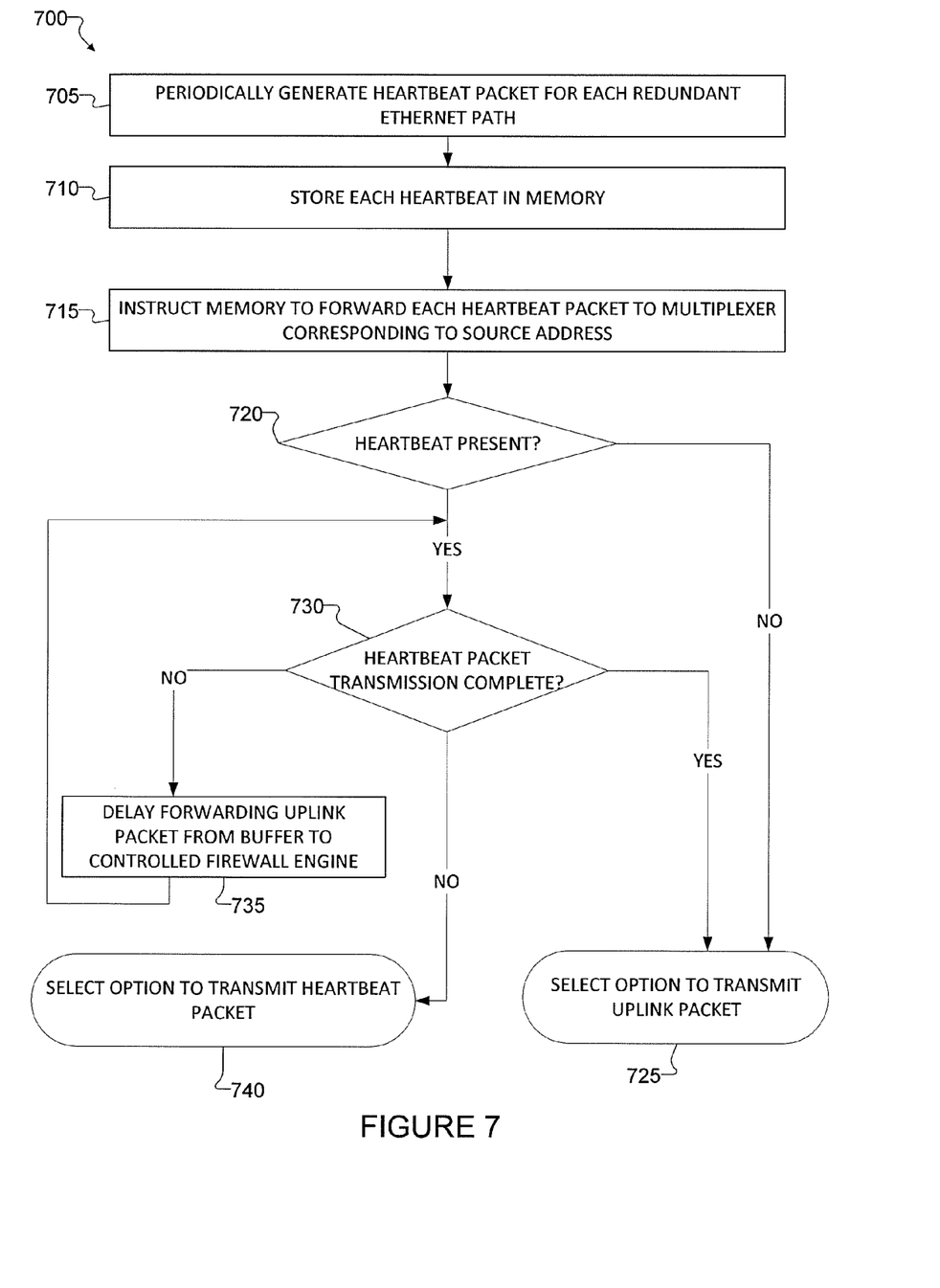
FIG. 7 illustrates an example method for selectively transmitting an uplink packet according to this disclosure.

FIG. 7 illustrates an example method 700 for selectively transmitting an uplink packet according to this disclosure. For ease of explanation, the method 700 is described with respect to the FPGA 400 implementing the hardware assist 305 of FIG. 3. The method 700 could be used by any other suitable device.

In step 705, the FPGA 400 periodically generates a heartbeat packet for each redundant Ethernet path. For example, the processor 480 can generate heartbeat packets at a one-second interval, including one heartbeat packet for each PHY 330*a*-330*b*. In step 710, the FPGA 400 stores each heartbeat packet in a memory. For example, the processor 480 can write the heartbeat packets to the HPS 486.

In step 715, the FPGA instructs the memory to forward each heartbeat packet to a MUX corresponding to a source address. For example, the processor 480 can transmit a control signal to the HPS 486 including an instruction to forward the heartbeat packet for one Ethernet link to the MUX 484*b* or for another Ethernet link to the MUX 484*c*.

In step 720, the FPGA 400 determines whether a heartbeat packet is present to be transmitted to the Ethernet network. For example, the controller 488 can determine whether the HPS 486 is storing a heartbeat packet. If a heartbeat packet is not present, in step 725, the controller 488 sends a control signal to the appropriate MUX 484*b*-484*c* to select an uplink packet received from the control firewall engine 462 when outputting a packet to the PHY 330*a*-330*b*.

If a heartbeat packet is present, in step 730, the FPGA 400 (such as the controller 488) determines whether the MUX 484*b*-484*c* has completed transmission of the heartbeat packet in order to commence transmitting uplink packets from the MCU 310. If the FPGA 400 has completed transmission of the heartbeat packet, the method proceeds to step 725, where the controller 488 sends a control signal to the MUX 484*b*-484*c* to select an uplink packet received from the control firewall engine 462 when outputting a packet to the corresponding PHY 330*a*-330*b*.

If the MUX is in the process of transmitting a heartbeat packet, the method proceeds to steps 735 and 740. In step 735, the controller 488 prevents the buffer 482 from forwarding uplink packets to the control firewall engine 462. For example, the controller 488 can delay transmitting a control signal to instruct the control firewall engine 462 to read an uplink packet from the buffer 482. As another example, the controller 488 can instruct the buffer 482 to deny read access or can delay transmitting a control signal to instruct the buffer 482c to allow read access. In step 740, the FPGA 400 can transmit the heartbeat packet to the Ethernet network through the corresponding PHY. The process 700 returns to step 730 indicating that the controller 488 can continue the delay(s) until the MUX 484b-484c completes transmission of the heartbeat packet.

Although FIGS. 5 through 7 illustrate example methods, various changes may be made to FIGS. 5 through 7. For example, while shown as a series of steps, various steps in each figure could overlap, occur in parallel, occur in a different order, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method comprising:
   receiving downlink packets from multiple physical Ethernet interfaces;
   selectively discarding some of the downlink packets based on at least one packet filtering criterion;
   updating a network connectivity database using address information in non-discarded downlink packets;
   mapping a path for each of the non-discarded downlink packets using the database; and
   transmitting the non-discarded downlink packets to a single network interface.

2. The method of claim 1, further comprising:
   receiving an uplink packet from the single network interface;
   selecting a primary physical Ethernet interface from the multiple physical Ethernet interfaces based on information in the database; and
   transmitting the uplink packet through the selected primary physical Ethernet interface.

3. The method of claim 2, further comprising:
   determining that a path associated with the primary physical Ethernet interface is impaired;
   in response to the determination, replacing address information corresponding to the primary physical Ethernet interface in the uplink packet with address information corresponding to a secondary physical Ethernet interface from the multiple physical Ethernet interfaces; and
   transmitting the uplink packet through the secondary physical Ethernet interface.

4. The method of claim 3, further comprising at least one of:
   calculating a frame check sequence (FCS) for the primary physical Ethernet interface; and
   calculating an FCS for the secondary physical Ethernet interface.

5. The method of claim 1, further comprising:
   determining whether each downlink packet is associated with a specified protocol;
   in response to determining that one of the downlink packets is associated with the specified protocol, retrieving a portion of the downlink packet; and
   updating the database using the portion of the downlink packet.

6. The method of claim 1, wherein selectively discarding some of the downlink packets comprises at least one of:
   discarding downlink packets not associated with a specified protocol; and
   after receiving a threshold quantity of broadcast or multicast packets within a specified period of time, discarding subsequently-received broadcast or multicast packets for a remainder of the specified period of time.

7. The method of claim 1, further comprising:
   transmitting the non-discarded downlink packets to a media access controller (MAC) through the single network interface.

8. An apparatus comprising:
   multiple control firewall engines configured to:
      receive downlink packets from multiple physical Ethernet interfaces, each of the control firewall engines configured to be coupled to a respective one of the physical Ethernet interfaces; and
      selectively discard some of the downlink packets based on at least one packet filtering criterion; and
   at least one processing device configured to:
      update a network connectivity database using address information in non-discarded downlink packets;
      map a path for each of the non-discarded downlink packets using the database; and
      initiate transmission of the non-discarded downlink packets to a single network interface.

9. The apparatus of claim 8, wherein:
   the apparatus further comprises an additional control firewall engine configured to receive an uplink packet from the single network interface; and the at least one processing device is further configured to:
  select a primary physical Ethernet interface from the multiple physical Ethernet interfaces based on information in the database; and
  initiate transmission of the uplink packet through the selected primary physical Ethernet interface.

10. The apparatus of claim 9, wherein the at least one processing device is further configured to:
  determine that a path associated with the primary physical Ethernet interface is impaired;
  in response to the determination, replace address information corresponding to the primary physical Ethernet interface in the uplink packet with address information corresponding to a secondary physical Ethernet interface from the multiple physical Ethernet interfaces; and
  initiate transmission of the uplink packet through the secondary physical Ethernet interface.

11. The apparatus of claim 8, wherein each of the control firewall engines is further configured to calculate a frame check sequence (FCS).

12. The apparatus of claim 8, wherein the at least one processing device is further configured to:
  determine whether each downlink packet is associated with a specified protocol;
  in response to determining that one of the downlink packets is associated with the specified protocol, retrieve a portion of the downlink packet; and
  update the database using the portion of the downlink packet.

13. The apparatus of claim 8, wherein the control firewall engines are configured to selectively discard some of the downlink packets by at least one of:
  discarding downlink packets not associated with a specified protocol; and
  after detecting receipt of a threshold quantity of broadcast or multicast packets within a specified period of time, discarding subsequently-received broadcast or multicast packets for a remainder of the specified period of time.

14. The apparatus of claim 8, wherein the control firewall engines and the at least one processing device comprise a field programmable gate array (FPGA).

15. The apparatus of claim 8, wherein the at least one processing device is configured to initiate transmission of the non-discarded downlink packets to a media access controller (MAC) through the single network interface.

16. The apparatus of claim 8, further comprising:
  multiple multiplexers configured to define multiple paths between the physical Ethernet interfaces and an Ethernet node, the multiple paths including the control firewall engines; and
  a controller configured to control the multiplexers.

17. A system comprising:
  multiple physical Ethernet interfaces configured to be coupled to multiple Ethernet communication links; and
  a hardware assist device comprising:
    multiple control firewall engines configured to:
      receive downlink packets from the physical Ethernet interfaces, each of the control firewall engines configured to be coupled to a respective one of the physical Ethernet interfaces; and
      selectively discard some of the downlink packets based on at least one packet filtering criterion; and
    at least one processing device configured to:
      update a network connectivity database using address information in non-discarded downlink packets;
      map a path for each of the non-discarded downlink packets using the database; and
      initiate transmission of the non-discarded downlink packets to a single network interface.

18. The system of claim 17, wherein:
  the hardware assist device further comprises an additional control firewall engine configured to receive an uplink packet from the single network interface; and
  the at least one processing device is further configured to:
    select a primary physical Ethernet interface from the multiple physical Ethernet interfaces based on information in the database; and
    initiate transmission of the uplink packet through the selected primary physical Ethernet interface.

19. The system of claim 18, wherein the at least one processing device is further configured to:
  determine that a path associated with the primary physical Ethernet interface is impaired;
  in response to the determination, replace address information corresponding to the primary physical Ethernet interface in the uplink packet with address information corresponding to a secondary physical Ethernet interface from the multiple physical Ethernet interfaces; and
  initiate transmission of the uplink packet through the secondary physical Ethernet interface.

20. The system of claim 17, wherein the control firewall engines are configured to selectively discard some of the downlink packets by at least one of:
  discarding downlink packets not associated with a specified protocol; and
  after detecting receipt of a threshold quantity of broadcast or multicast packets within a specified period of time, discarding subsequently-received broadcast or multicast packets for a remainder of the specified period of time.

21. The method of claim 1, wherein the multiple physical Ethernet interfaces are configured to communicate over a redundant pair of Ethernet networks.

22. The apparatus of claim 8, wherein the apparatus is configured to be coupled between (i) the multiple physical Ethernet interfaces and (ii) a single connection Ethernet node, the apparatus configured to provide the single connection Ethernet node with an ability to communicate over a redundant pair of Ethernet networks.

23. The system of claim 17, wherein:
  the hardware assist device is configured to be coupled between (i) the multiple physical Ethernet interfaces and (ii) a single connection Ethernet node, the hardware assist device configured to provide the single connection Ethernet node with an ability to communicate over a redundant pair of Ethernet networks; and
  the single connection Ethernet node is configured to communicate with the hardware assist device via a single network interface card (NIC) using a single NIC driver.

* * * * *